Figure 1:
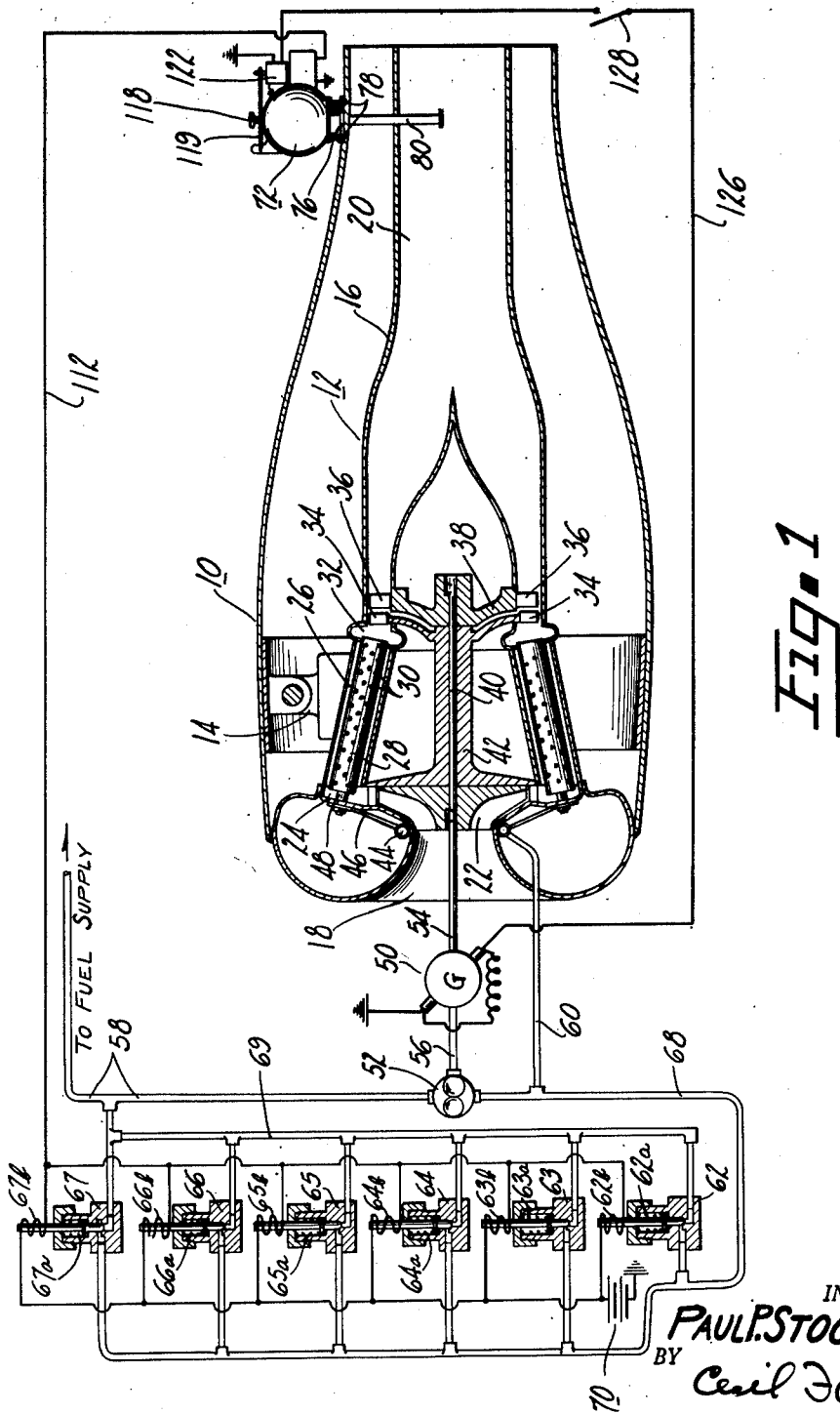

May 5, 1953  P. P. STOCKINGER  2,637,165
ENGINE OVER TEMPERATURE FUEL CONTROL MECHANISM
Filed Aug. 20, 1947  2 SHEETS—SHEET 1

INVENTOR.
PAUL P. STOCKINGER
BY
Cecil F. Arens
ATTORNEY

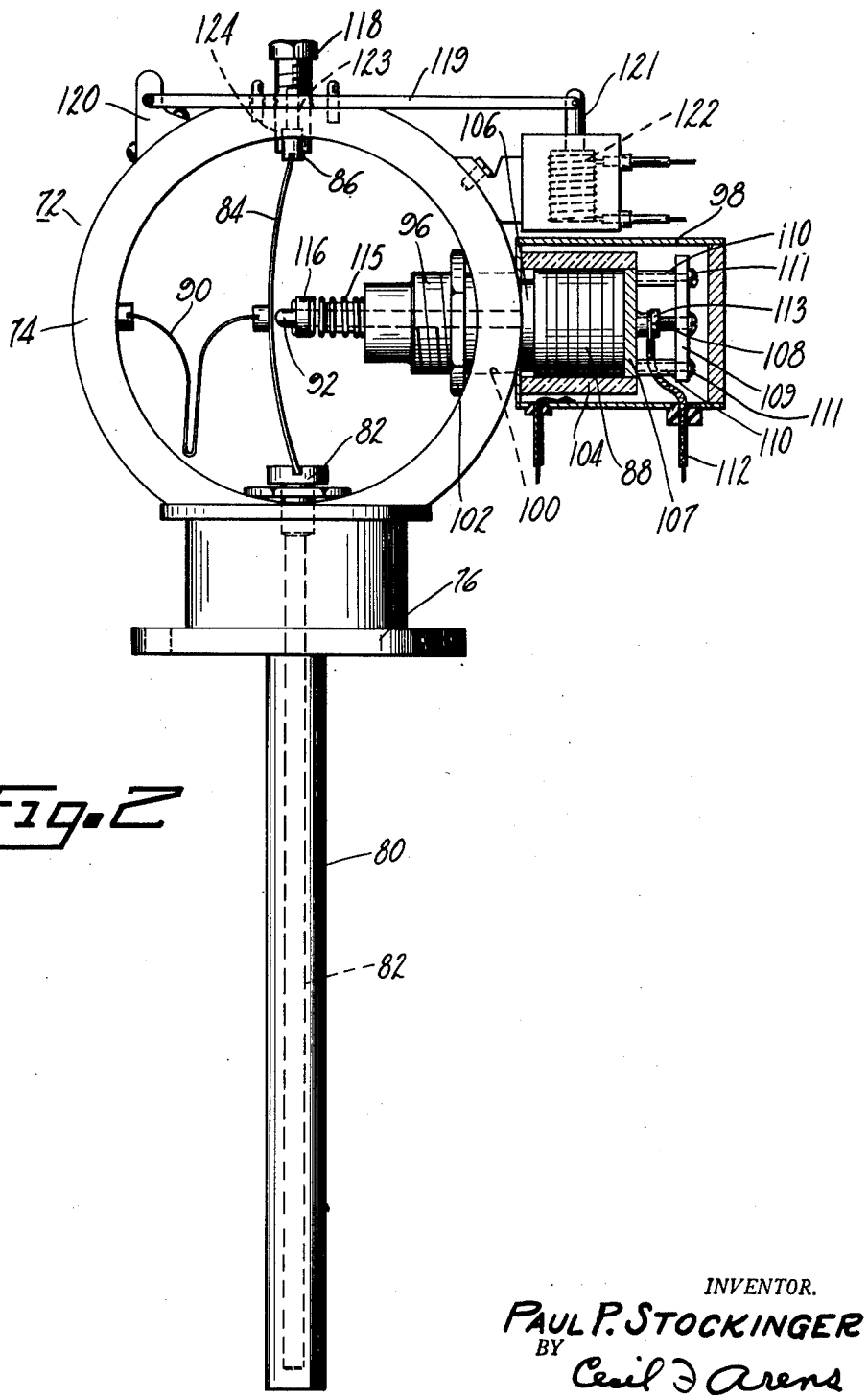

Patented May 5, 1953

2,637,165

UNITED STATES PATENT OFFICE 2,637,165

ENGINE OVER TEMPERATURE FUEL CONTROL MECHANISM

Paul P. Stockinger, South Bend, Ind., assignor to Bendix Aviation Corporation, South Bend, Ind., a corporation of Delaware Application August 20, 1947, Serial No. 769,722

6 Claims. (Cl. 60—39.09)

This invention relates generally to a control apparatus for engines, and while not limited thereto, it is particularly adapted for jet engines and similar power plants.

Since the advent of the turbo jet engine one of the most troublesome problems has been in the control of excessively high temperatures which are deleterious to the engine. It is, therefore, an object of this invention to provide a control mechanism for maintaining temperature in a jet engine within a predetermined range.

An object of the invention resides in the provision of an overtemperature control for a jet engine wherein the fuel flow thereto is a function of engine temperature.

A still further object of the invention lies in the provision of a fuel system for a jet engine wherein the flow of fuel thereto is metered in accordance with the temperature of the engine.

Another important object of the invention is to provide an electrically controlled fuel system for a jet engine wherein the flow of fuel to the engine is regulated by a plurality of valves each of which is operated as a function of some preselected temperature.

A more important object of the invention is to provide an overtemperature control for a jet engine wherein the fuel flow thereto is a function of engine temperature and wherein a predetermined temperature range may be varied in accordance with the R. P. M. of the engine.

The above and other objects and features of the invention will be apparent from the following description of the apparatus taken in connection with the accompanying drawings which form a part of this specification, and in which:

Figure 1 is a diagrammatic illustration of a fuel system associated with a jet engine, and incorporating the features of my invention; and Fig. 2 is a sectional view partly in elevation of one of the elements of the combination comprising the invention.

Referring now to Figure 1 of the drawings, reference numeral 10 designates an aircraft nacelle in which is located a jet engine 12 carried by brackets 14. The engine 12 comprises an outer casing 16 flared or turned inwardly at its front end to form an air inlet 18 and shaped at its rear end to define a reaction tube 20. A rotary air compressor 22, is disposed within the casing 16 for forcing air into an annular header 24 which is in communication with a plurality of peripherally spaced cylinder-like burner chambers 26 which house burners 28 having air inlet passages 30 in the walls thereof. The burners 28 discharge into a collector ring 32 arranged to convey the hot air and products of combustion past a set of stationary blades 34 and against blades 36 integral with a turbine rotor 38. The rotor 38 and air compressor 22 are mounted on a common shaft 40 rotatably supported in a bearing 42. Air entering the inlet 18 is picked up by the compressor, which forces the air into the annular header 24, burner chamber 26, and thence through the air inlet passages 30 into the burners 28 where combustion takes place. The expanded air and products of combustion are first directed against the blades 36 of the turbine rotor 38 to thereby drive the compressor and then discharged to atmosphere through the reaction tube 20 effect propulsion of the aircraft.

The jet engine 12 is provided with a manifold 44 having branch conduits 46 connected to nozzles 48 which discharge fuel into the burners 28. A generator 50, and pump 52 are drivably connected to the engine 12 through shafts 54 and 56. The pump 52 has its inlet connected to a fuel supply reservoir, not shown, by conduit 58 and its outlet connected to the jet engine by conduit 60.

In order that the fuel supply to the engine may be regulated in accordance with the temperature inside the casing or cone 16, I have provided a temperature controlled apparatus for the main fuel supply comprising a plurality of solenoid valves 62, 63, 64, 65, 66 and 67 arranged with respect to the pump 52 and engine to by-pass a varying amount of the fuel discharged at the pump outlet back to the fuel supply reservoir depending upon the engine temperature within a predetermined temperature range. A conduit 68 connects the discharge side of the pump 52 to the inlet side of the pump via conduit 69 which is in communication with said pump inlet. The solenoid valves are interconnected with conduits 68 and 69 to form a return path for the fuel from the pump discharge port. The valves are arranged in parallel with respect to each other, and in series with the pump and located between the pump discharge and inlet ports to thereby permit circulation therebetween. With this arrangement it becomes obvious that the flow of fuel to the engine can be varied by opening or closing the valves. The valves 62, 63, 64, 65, 66 and 67 are normally closed by springs 62a, 63a, 64a, 65a, 66a and 67a and are made operable in response to electrical energization of coils 62b, 63b, 64b, 65b, 66b, and 67b.

To energize the coils of the valves an electrical circuit is provided which comprises besides the solenoid valves, a battery or source of supply 70, and a temperature responsive device 72 mounted on the nacelle 10, as shown. The valves are constituted so that they are sequentially opened or closed as the temperature of the engine rises and falls respectively. Sequential operation of the valves may be obtained by giving each of the springs 62a, 63a, 64a, 65a, 66a, and 67a different preloads thereby necessitating a coil of preselected value for each of the valves, that is, each valve will be equipped with a coil having the required number of ampere turns to move the valve against its associated spring.

The temperature responsive device 72, as best shown in Figure 2, includes a housing 74 provided with a mounting flange 76 secured to the nacelle 10 by bolts 78. A steel tubular element 80 depends from the flange 76.

The tubular element is open at its end attached to the flange to receive a quartz rod 82 one end of which bottoms in the closed end of the tubular element 80. The other end of the quartz rod extends into the housing 74 and is equipped with a slotted cap 82 to engage one end of a member 84 the other end of which is carried by a slotted pin 86. The length of the quartz rod is relatively unaffected by temperature changes, while on the other hand the tubular element, on the bottom of which the quartz rod rests, changes its length in accordance with temperature variations. For example, a rise in engine temperature will cause the tubular element to lengthen thereby permitting the quartz rod to be forced further into the tubular element thus allowing the member 84 to straighten out, at which time carbon discs 88 are compressed by the joint action of the member 84 and spring 90 acting in an axial direction along stem 92. The stem is slidably positioned in a stepped hub 96 which is integral with a housing 98. The hub 96 which is threaded exteriorly passes through an opening 100 in the housing 74, so that a nut 102 can be threaded onto the hub to thereby hold the housing 98 adjustably in place. The carbon discs 88 are disposed within a porcelain sleeve 104. One end of the stem 92 is provided with a disc 106 against which carbon discs 88 are in electrical contact. A metal disc 107 is disposed in the end of the porcelain cup opposite disc 106 and is held in place by a screw 108 threadedly engaging the metal disc for static pressure adjustment of the carbon pile. The screw 108 passes through a support 109 mounted on the porcelain sleeve. The support is spaced from the porcelain sleeve by spacers 110 through which screws 111 pass to engage the porcelain sleeve. A wire 112 is held in conducting relationship to the metal disc 107 by a nut 113 threadedly engaging the screw 108. The stem 92 provides a ground for the carbon discs 88, through the hub 96 and housing 74. A coiled spring 115 is arranged to circumscribe the stem 92 so that one end of the spring abuts the hub 96 and the free end of the spring is in engagement with a washer 116 carried by the stem to thereby urge the stem to the left, thus reducing compression of the carbon discs and consequently increasing the resistance of the carbon pile.

Manual adjustment of the pin 86 for varying the engine temperature range may be obtained by threading capscrew 118 in or out of lever 119 which is pivotedly fixed at one end to the housing 74 by a bracket 120. The other end of the lever is fastened to a plunger 121. For automatically varying engine temperature range a solenoid 122 is energized to thereby pivot lever 119 which moves capscrew 118 downwardly compressing member 84. The capscrew 118 is bored and countersunk at 123 to receive pin 86. The housing 74 is bored at 124 to receive the capscrew to permit the same to slide freely in and out of the bore to thereby vary the compression on member 84, and hence the uncontrolled range of the engine temperature. That is, compressing member 84 so that its center moves away from stem 92 increases the uncontrolled engine temperature range, which means that the engine temperature can be varied by either screwing capscrew in and out of lever 119 or by energization of solenoid 122 which causes lever 119 to move downwardly.

The circuit for energizing solenoid 122 comprises the generator 50, switch 128, and line 126 which interconnects the solenoid with the generator. In the jet engine there are certain speeds at which it is desirable to raise the normal operating engine temperature. Since the generator is driven by the engine and the voltage of the generator increases with speed a voltage is selected corresponding to the speed at which the normal engine temperature increases. The solenoid is wound such that the selected voltage will sufficiently energize the solenoid to move the lever downwardly thereby changing the range.

Operation of the system is as follows:

Assume a condition of engine operation wherein the engine temperature is below the controlled range. At this time the solenoid valves will be closed, as shown in Figure 1 of the drawings, since the member 84 is out of contact with stem 92, and, therefore, the resistance offered by the loosely arranged carbon discs 88 is too great to pass sufficient current to even energize the solenoid requiring the least amount of power for its operation. All the fuel discharged by the pump 52 is now being delivered to the burners 26 through the manifold 44.

With an increase in engine temperature to within the preselected range of temperature control the tubular element 80 will expand thereby allowing the member 84 to tend to straighten out so that it contacts stem 92. The combined force of spring 90 and member 84 acts on the end of the stem in an axial direction to compress the discs 88. Upon initial compression of the discs the resistance of the pile is reduced sufficiently to pass enough current to energize coil 62b, which coil requires the least amount of power for actuating the valve against its associated spring 62a. Opening valve 62 by-passes some of the fuel through conduits 68 and 69 back to the fuel supply or inlet side of the pump, thus producing a circulating action. As the engine temperature increases the combined forces of spring 90 and member 84 becomes greater thereby increasing the compression on the pile, and accordingly decreasing its resistance, so that more current flows. This increase in current energizes the other coils thereby opening additional valves to by-pass more fuel to the fuel supply, leaving less to be fed into the engine. As the engine temperature rises the resistance of the pile decreases thereby permitting a greater amount of current to flow. This action continues until all the valves are opened, at which time just enough of the total fuel discharged by the pump 52 flows to the engine to maintain a fire in the combustion chamber. As the engine temperature drops the resistance of the pile increases, hence a decrease in the current to the valves. This means that if the current has fallen below that required to energize coil 67, the valve will be closed by spring 67a, and so on for each of the valves as the temperature of the engine drops thereby deenergizing each of the valves in sequence until all the valves are closed by their respective springs.

The preselected operating temperature range of the engine may be changed by manually adjusting the cap screw 118; for example turning the screw into the lever 119 will compress the member 84 so that the space between the member and the stem 92 will be greater, hence the engine temperature will have to be necessarily greater before the member 84 straightens out to where it contacts the stem 92 for initial compression of the carbon discs. Turning the cap screw as aforementioned raises the low end of the preselected operating temperature range, that is, extends the non-controlled range, which is from the ambient temperature to the engine temperature at which the first valve opens. Likewise, turning the capscrew out of the lever lowers the low end of the preselected operating temperature range, that is, decreases the non-controlled temperature range.

The operating temperature range of the engine may be changed automatically in response to predetermined engine speeds by closing switch 128, the effect of which is the same as turning capscrew into lever 119.

Although only one embodiment of the invention has been illustrated and described, various changes in the form and relative arrangement of the parts may be made to suit requirements.

Having thus described the various features of the invention, what I claim as new and desire to secure by Letters Patent is:

1. For use with an engine having a fuel system with a pump therein so arranged that the discharge side of the pump is in communication with the engine and the inlet side of the pump is adapted to be in communication with a fuel supply, an electrical circuit embracing a temperature responsive device arranged on the engine to sense the temperature thereof, said device being capable of varying the current in the circuit in proportion to engine temperature, and means connecting the discharge side of the pump with the inlet side of the pump to allow for the circulation of fuel therebetween and thereby reduce flow to the engine, said means including a plurality of controlled flow paths in parallel, each flow path being provided with electrical means in circuit with said device to be energized respectively by different current values established by said temperature responsive device.

2. For use with an engine having a fuel system with a pump therein so arranged that the discharge side of the pump is in communication with the engine and the inlet side of the pump is adapted to communicate with a fuel supply, an electrical circuit including a temperature responsive device arranged on the engine to sense the temperature thereof, said device being capable of varying the current in the circuit in proportion to engine temperature, and means connecting the discharge side of the pump with the inlet side thereof for returning fuel to the latter to thereby reduce the fuel flow to the engine, said means including a plurality of solenoid valves arranged in parallel between the discharge and inlet sides of the pump, said solenoid valves being in circuit with said device and calibrated to respond sequentially to the temperatures sensed within a predetermined range by the temperature responsive device for controlling the amount of fuel returned to the inlet side of the pump.

3. For use with an engine having a fuel system with a pump therein so arranged that the discharge side of the pump is in communication with the engine and the inlet side of the pump is adapted to communicate with a fuel supply, a temperature responsive device arranged on the engine to sense the temperature thereof, means connecting the discharge side of the pump with the inlet side thereof for returning fuel to the latter to thereby reduce the fuel flow to the engine, said means including a plurality of solenoid valves arranged in parallel between the discharge and inlet sides of the pump, said valves being calibrated to respond sequentially to the temperatures sensed within a predetermined temperature range setting by the temperature responsive device for controlling the amount of fuel returned to the inlet side of the pump, and means responsive to an engine condition for changing the predetermined temperature range setting of said device.

4. For use with an engine having a fuel system with a pump therein so arranged that the discharge side of the pump is in communication with the engine and the inlet side of the pump is adapted to communicate with a fuel supply, a temperature responsive device arranged on the engine to sense the temperature thereof, means connecting the discharge side of the pump with the inlet side thereof for returning fuel to the latter to thereby reduce the fuel flow to the engine, said means including a plurality of solenoid valves constructed and arranged to respond sequentially to the temperature sensed within a predetermined temperature range setting by the temperature responsive device for controlling the amount of fuel returned to the inlet side of the pump, and means controlled by engine speed for automatically varying the temperature range setting of the device.

5. For use with an engine having a fuel system with a pump therein so arranged that the discharge side of the pump is in communication with the engine and the inlet side of the pump is adapted to communicate with a fuel supply, a temperature responsive device arranged on the engine to sense the temperature thereof, means connecting the discharge side of the pump with the inlet side thereof for returning fuel to the latter to thereby reduce the fuel flow to the engine, said means including a plurality of solenoid valves constructed and arranged to respond sequentially to the temperature sensed within a predetermined temperature range setting by the temperature responsive device for controlling the amount of fuel returned to the inlet side of the pump, and electrical means responsive to a signal proportional to engine speed for varying the temperature range setting of the device.

6. In a fuel system for an engine, the combination of a pump, a pipeline from the discharge side of the pump to the engine, a connection from the discharge side of the pump to the inlet side thereof, a plurality of valves arranged in said connection to provide parallel flow paths, an electrically actuated device for each valve, each device being calibrated to require a different value of current for its actuation, and an electrical circuit embracing said devices and including a temperature responsive mechanism arranged to sense engine temperature, said mechanism being constructed and arranged to vary the current in the circuit in proportion to engine temperature.

PAUL P. STOCKINGER.

References Cited in the file of this patent

UNITED STATES PATENTS

| Number | Name | Date |
|---|---|---|
| 941,426 | Loudon | Nov. 30, 1909 |
| 1,841,629 | Pigeolet | Jan. 19, 1932 |
| 1,970,942 | Payne | Aug. 21, 1934 |
| 2,078,958 | Lysholm | May 4, 1937 |
| 2,095,991 | Lysholm | Oct. 19, 1937 |
| 2,336,232 | Doran | Dec. 7, 1943 |
| 2,333,641 | Focke et al. | Aug. 28, 1945 |
| 2,404,428 | Bradbury | July 23, 1946 |
| 2,405,888 | Holley | Aug. 13, 1946 |
| 2,429,739 | Arnhym | Oct. 28, 1947 |
| 2,432,177 | Sédille | Dec. 9, 1947 |
| 2,440,567 | Armstrong | Apr. 27, 1948 |
| 2,461,608 | Laing | Feb. 15, 1949 |
| 2,478,909 | Flagle | Aug. 16, 1949 |

FOREIGN PATENTS

| Number | Country | Date |
|---|---|---|
| 164,125 | Switzerland | Dec. 1, 1933 |